(12) United States Patent
Jemes et al.

(10) Patent No.: US 7,263,719 B2
(45) Date of Patent: Aug. 28, 2007

(54) SYSTEM AND METHOD FOR IMPLEMENTING NETWORK SECURITY POLICIES ON A COMMON NETWORK INFRASTRUCTURE

(75) Inventors: Brian Jemes, Palo Alto, CA (US); John Melvin Brawn, San Jose, CA (US); Joseph Garcia, Mountain View, CA (US); Michael Milligan, Palo Alto, CA (US); John M. Pape, Fort Collins, CO (US); Jeff Hansell, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 550 days.

(21) Appl. No.: 09/726,072

(22) Filed: Nov. 29, 2000

(65) Prior Publication Data

US 2001/0042213 A1    Nov. 15, 2001

Related U.S. Application Data

(60) Provisional application No. 60/204,229, filed on May 15, 2000.

(51) Int. Cl.
*G06F 15/16* (2006.01)
(52) U.S. Cl. ............................. 726/12; 726/3; 726/11; 726/14; 726/15; 709/220
(58) Field of Classification Search ............... 713/201, 713/162; 709/200–220; 726/1–3, 11–12, 726/14–15
See application file for complete search history.

(56) References Cited

U.S. PATENT DOCUMENTS

| | | | |
|---|---|---|---|
| 5,864,666 A | 1/1999 | Shrader | |
| 5,884,025 A | 3/1999 | Baehr et al. | |
| 5,968,176 A * | 10/1999 | Nessett et al. | 713/201 |
| 6,012,088 A | 1/2000 | Li et al. | |
| 6,052,788 A * | 4/2000 | Wesinger et al. | 713/201 |

(Continued)

FOREIGN PATENT DOCUMENTS

| | | |
|---|---|---|
| WO | WO98/57465 | 12/1998 |
| WO | WO00/78001 | 12/2000 |

OTHER PUBLICATIONS

Bellovin, et al., "Network Firewalls", IEEE Communications Magazine, Sep. 1994, pp. 50-57.
Loshin, Pete, "TCP/IP Clearly Explained", Morgan Kaufmann, 1999, pp. 38-40.

*Primary Examiner*—Emmanuel L. Moise
*Assistant Examiner*—Minh Dieu Nguyen

(57) ABSTRACT

A secure network is provided which includes a plurality of network bubbles having a plurality of bubble partitions. Each bubble partition has at least one network device configured to transmit and receive data. All the network devices that belong to or correspond to a particular network bubble have the same network security policy. The secure network also includes a plurality of network control points, which has one or more network control point devices having at least one interface. Each bubble partition is connected to at least one network control point. The network control point is used to provide a connection between at least two network devices. Each network control point device is configured to enforce the network security policy of all the network bubbles that are connected to it. During the transmission of data from one network device to another network device, one or more network control points are traversed.

31 Claims, 5 Drawing Sheets

U.S. PATENT DOCUMENTS

| | | | |
|---|---|---|---|
| 6,067,620 A * | 5/2000 | Holden et al. | 713/155 |
| 6,170,012 B1 * | 1/2001 | Coss et al. | 709/229 |
| 6,182,226 B1 | 1/2001 | Reid et al. | |
| 6,212,558 B1 * | 4/2001 | Antur et al. | 709/221 |
| 6,223,209 B1 | 4/2001 | Watson | |
| 6,243,754 B1 | 6/2001 | Guerin et al. | |
| 6,304,973 B1 * | 10/2001 | Williams | 713/201 |
| 6,345,299 B2 | 2/2002 | Segal | |
| 6,353,886 B1 | 3/2002 | Howard et al. | |
| 6,453,419 B1 * | 9/2002 | Flint et al. | 713/201 |
| 6,484,261 B1 * | 11/2002 | Wiegel | 726/11 |

\* cited by examiner

SYSTEM AND METHOD FOR IMPLEMENTING NETWORK SECURITY POLICIES ON A COMMON NETWORK INFRASTRUCTURE

CROSS-REFERENCE TO RELATED APPLICATION

This application claims priority from U.S. provisional patent application Ser. No. 60/204,229, filed May 15, 2000, which is herein incorporated by reference for all purposes.

BACKGROUND OF THE INVENTION

1. Field of the Invention

The present invention relates particularly to systems and methods for providing network security and, more particularly to systems and methods for implementing network security policies on a common network infrastructure.

2. Description of the Related Art

Company networks are vulnerable to numerous network attacks. Network firewalls or similar approaches are deployed as a common business practice to mitigate the risk of such attacks. Typically these security measures allow for unrestricted connectivity within the company or among a known collection of host devices, but they restrict access from public networks and other organizations or unknown devices. For example, the company may allow employees to access any web site on the public Internet, but prohibit access to confidential internal web sites by unknown users from public networks.

Several types of devices have been developed that perform network firewall functions. One commonly known device is a router, which is a device that determines the next network point to which a packet of information is to be delivered. Before the packet is forwarded to another device, the router may use an access list that provides conditions or rules to determine whether the packet has access to the particular destination. In addition, these devices may provide functions such as user authentication. Also, application proxies, e.g., socks and caching web proxies, allow specific applications to be executed for network security and might also employ user authentication.

Companies typically have a network security policy that describes the type of access that should be permitted through firewall devices. This policy is achieved through the application of a combination of the network firewall devices described above. One common network security model implemented by many companies is the concept of dividing the networks into three categories: internal, external, and De-Militarized Zone (DMZ). This type of network security policy is defined by the access permitted between these network categories. That is, the network firewall is made up of devices that provide the interconnections between these network categories. The network firewall is located at a network control point, which is located between the internal network and the external network, e.g., the public Internet, and at any direct links to other companies. End-user hosts and internal servers are part of the internal network. The public Internet and other company networks are part of the external network. Web servers, email servers and other application servers that require general connectivity with the external network are part of the DMZ.

A common network security policy may be that internal systems are permitted to create connections to the external networks, but connections from the external network to the internal network are not permitted, unless they are accompanied by user authentication. In addition, the DMZ hosts are permitted to have connectivity to the external networks and the internal networks independently, but are not permitted to have "pass-through" connectivity from the external networks to the internal networks. An exception to the common network security policy might be configured into the network firewall when, for example, a DMZ or external network may have a particular user or host that must be permitted access to a particular host in the internal network.

The internal, external, and DMZ architecture, however, has many drawbacks. For example, if the company network has multiple external connections to the public Internet that are in different geographic locations, wide-area asymmetric routing to the public Internet is likely. That is, inbound and outbound data for a given connection will not pass through the same firewall device and therefore firewall policies that rely on inspection of the protocol state will fail, because the protocol state will reside in two different firewall devices. In Internet Protocol (IP) networks, technologies such as Network Address Translation (NAT) may be used to work around this problem, but these technologies do not address the underlying issue and often introduce problems in large or complex networks. Currently, no technology is generally available for synchronizing the protocol state between firewall devices in separate geographic locations.

In addition, this architecture is limited to having only one internal network, which exposes the company to great risks if an unauthorized user gains access to the internal network. This architecture also does not allow the company the option of segmenting risk. Hence, a risk taken by one host in the internal network is a risk taken indirectly by all the other hosts in the internal network. This becomes apparent when considering the above exception to the common network security policy. The risk to all the internal hosts is greatly increased for every host in the external network that is permitted access to the internal network via the network firewall or DMZ.

This architecture is further limited due to its difficulty in maintaining a uniform firewall policy for firewall devices that are across geographic locations and company units. Each firewall device has a combination of a number of diverse and complex rules that reflect the overall security policy and the specific exception cases required at that specific network control point. Each of these network control points represents a risk to the entire company. If there is a simple misconfiguration on any firewall device, the entire internal network is exposed to an unintended security breach or unwanted behavior. As the number of network control points increase, the likelihood of security exposure increases dramatically.

Another network security architecture includes establishing concentric rings of network access control. This architecture allows the most sensitive information resources to be kept in the innermost rings, while the most common information resources to be kept in the outermost rings. External networks are outside of the outermost ring. The network security policy for the outer rings is fairly permissive, while the network security policy for the inner rings is much more restrictive.

One limitation of the concentric ring architecture is that some connections are required to traverse multiple firewalls for communication between two hosts at different levels. For example, if there are four firewall rings, then the external hosts have to traverse four firewalls before gaining access to the inner host in the innermost ring. For each additional firewall traversed, the time required to access the inner host is increased.

Another limitation is that the network security policy for the inner rings is limited by the policy enforced for the outer rings. Therefore, it is not possible for the inner ring to permit connectivity from external networks that is disallowed by an outer ring. For example, it is impossible for an inner ring to allow the incoming telnet access, unless that access is also granted at each of the outer rings of security.

These limitations described above for the various network security architectures apply to networks of any size, but become more severe when considering large or highly distributed networks. A Network Service Provider (NSP), Internet Service Provider (ISP), Application Service Provider (ASP), E-Service Provider (ESP), or a large enterprise may have over 100 network control points around the world where a network security policy must be administered. Using the network architectures described above, it is almost impossible to ensure that the policies are consistent and error-free at each of the network control points.

Another drawback for large enterprises or service providers with firewalls at the network control points is that the network security policy governing any given hosts must be configured consistently at all the O(n) firewalls, where n is the number of network control points for the enterprise. This creates a lot of redundant work and greatly increases the likelihood of error in configuration. Also, this can lead to a lack of direct accountability for the network security policy. To determine the network security policy for any given host, the network security policy must be examined at every network control point across the enterprise. The network security policy implemented at network control points that are topologically distant from the host have an equal role in determining the enterprise network security policy for that host.

Therefore, it should be appreciated that there is a need for systems and methods that overcome the above drawbacks and limitations. The present invention fulfills this need as well as others.

SUMMARY OF THE INVENTION

A secure network is provided which includes a plurality of network bubbles having a plurality of bubble partitions. Each bubble partition has at least one network device configured to transmit and receive data. All the network devices that belong to or correspond to a particular network bubble have the same network security policy. The secure network also includes a plurality of network control points, which has one or more network control point devices having at least one interface. Each bubble partition is connected to at least one network control point. The network control point is used to provide a connection between at least two network devices. Each network control point device is configured to enforce the network security policy of all the network bubbles that are connected to it. During the transmission of data from one network device to another network device, one or more network control points are traversed.

BRIEF DESCRIPTION OF THE DRAWINGS

Embodiments of the present invention will now be described, by way of example only, with reference to the following drawings in which.

DESCRIPTION OF THE PREFERRED EMBODIMENT

Figure 1:
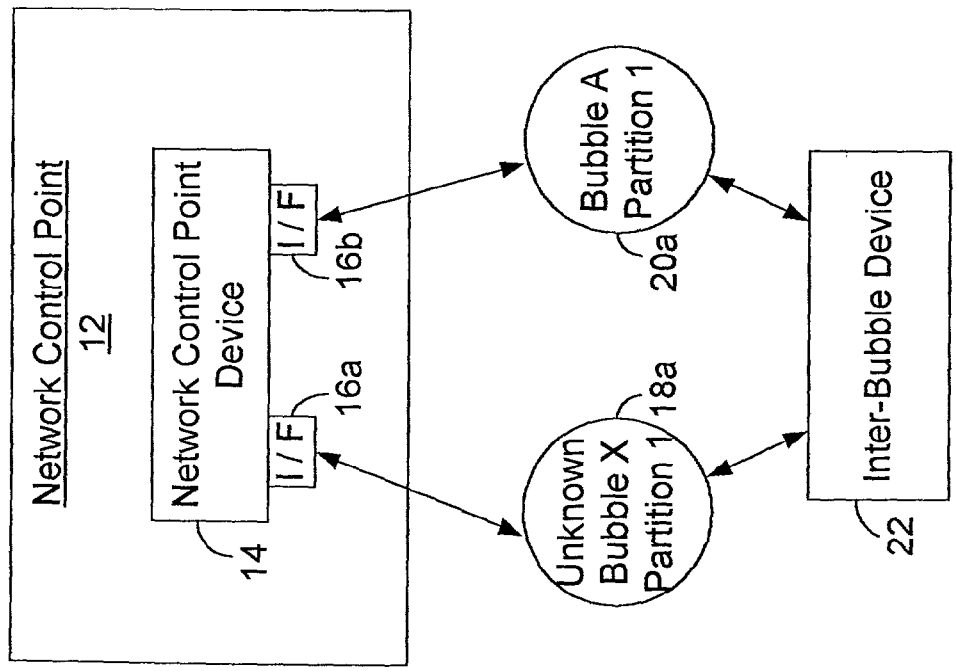
FIG. 1 is a simplified block diagram of a network security system.

In this patent, the present invention is described in detail with regard to the drawing figures briefly described below. Similar labels and numbers on one drawing figure may represent the same element on other drawing figures. As such, the following terms are used throughout the patent. For purposes of construction, such terms shall have the following meanings:

The term "bubble," unless otherwise specified, is intended to refer to two or more devices that have unrestricted network access with each other and share a common network access policy. Each bubble is made up of at least one bubble partition.

The term "bubble boundary," unless otherwise specified, is intended to refer to one or more devices in a network control point that connects to one or more bubble partitions, and enforces the network security policy for the bubble.

The terms "network access policy" and "network security policy," unless otherwise specified, are intended to refer to one or more rules or criteria that govern the movement of data across a bubble boundary.

The term "network control point," unless otherwise specified, is intended to refer to a physically co-located collection of one or more devices that perform one or more of the following functions: interconnect bubble partitions, interconnect network control point devices, interconnect network control points, and/or enforce a network security policy.

The term "bubble partition," unless otherwise specified, is intended to refer to a network of devices within a bubble, including bubble boundary devices, that connect to at least one network control point.

The term "bubble member," unless otherwise specified, is intended to refer to one or more devices with one or more network interfaces within a bubble, that has unrestricted network connectivity to all other devices within the same bubble.

The term "virtual backbone," unless otherwise specified, is intended to refer to a network that connects a plurality of network control points having the property of source integrity (e.g., anti-spoofing). The virtual backbone is external to all of the bubbles and the network control points.

The term "unknown bubble," unless otherwise specified, is intended to refer to all networks and devices that are not part of any known bubble. In an IP network, the unknown bubble includes the hosts and networks in the public Internet or private networks that are not part of known bubbles. In as much as they are unknown, no assumptions can be made with regard to connectivity between devices in the unknown bubble, nor can source integrity be assumed. There may be multiple unknown bubbles, each with one or more bubble partitions. Each unknown bubble partition can connect to multiple Network Control Points (NCP).

The term "known bubble," unless otherwise specified, is intended to refer to all bubbles with known network security policies and source integrity.

The term "inter-bubble device," unless otherwise specified, is intended to refer to a device with one or more network interfaces that is simultaneously a member of more than one bubble, but is not part of a network control point. Inter-bubble devices must enforce the network security policy for each of the bubbles of which they are members.

The term "network device," unless otherwise specified, is intended to refer to a device connected to a network. The device can be, e.g., a host, client, server, workstation, desktop, laptop, printer, router, and switch.

With reference now to the illustrative drawings, and particularly to FIG. 1, there is shown a simplified block diagram of a network security system 10. The network security system has a network control point 12 and two bubbles X, A, where each bubble includes one or more bubble partitions 18a, 20a (i.e., unknown bubble X includes bubble partition 18a, and bubble A includes bubble partition 20a). The network security system also includes an inter-bubble device 22.

The network control point 12 includes one or more network control point devices 14. Each network control point device might include one or more interfaces 16a, 16b, which are used to connect the network control point device to a bubble 18. By way of example, in the case of an Internet Protocol (IP) network, the interface may be a router port, or a Local Area Network (LAN) adapter on a host. In the case of a wireless network, the interface can represent a wireless access point connected to a device that routes data.

Network control point devices 14 are used to route data and/or enforce a network security policy. For example, data can be routed from unknown bubble partition 18a to bubble partition 20a, and vice versa, using the network control point devices. By way of example, this could be done in an IP network using a routing device capable of determining from the destination IP address that the data received on interface 16a should be sent to bubble 20a through interface 16b. In addition, the network control point devices can enforce the network security policy of the particular network control point 12. By way of example, in an IP network, routing devices can be used to enforce rules based on the contents of the data. Further, a wide variety of other devices can perform this function with differing levels of sophistication. In an IP network, one network policy decision that can be made by the network control point 12 involves allowing or restricting access based on the source IP address. More advanced devices can allow or restrict access by applying rules based on various protocols or an analysis of the context of a connection. The later capability is generally called stateful inspection. When a network control point device serves to enforce a particular network security policy, the network control point device might also be referred to as a bubble boundary device.

Each bubble can be an unknown bubble 18a or a known bubble 20a. The unknown bubble might represent the public Internet or a private network about which no security assumptions can be made. A device in the unknown bubble might or might not be able to access other devices that are located in the unknown bubble. Moreover, a device in the unknown bubble might or might not be able to access data from a device in a known bubble. Whether a device in an unknown bubble can access data from another device in a known bubble depends on the network security policy of the known bubble as enforced by a network control point device (i.e., bubble boundary).

The network security system 10 might also include an inter-bubble device 22 that connects two or more bubbles to one another. The inter-bubble device is typically used in a situation where it is desirable to move data between bubbles, or access resources from more than one bubble, or provide resources to more than one bubble without going through a network control point. The inter-bubble device differs from the network control point in that it principally exists to expedite the movement of data for select purposes. Hence, inter-bubble devices must include capabilities to enforce network security policies. The inter-bubble device provides a local connection between two or more bubble partitions 18a, 20a so that data can be processed with reduced network latency resulting in increased throughput. The inter-bubble device and the network control point device 14 implement the same network security policy with regards to bubbles 18a and 20a.

Figure 2:
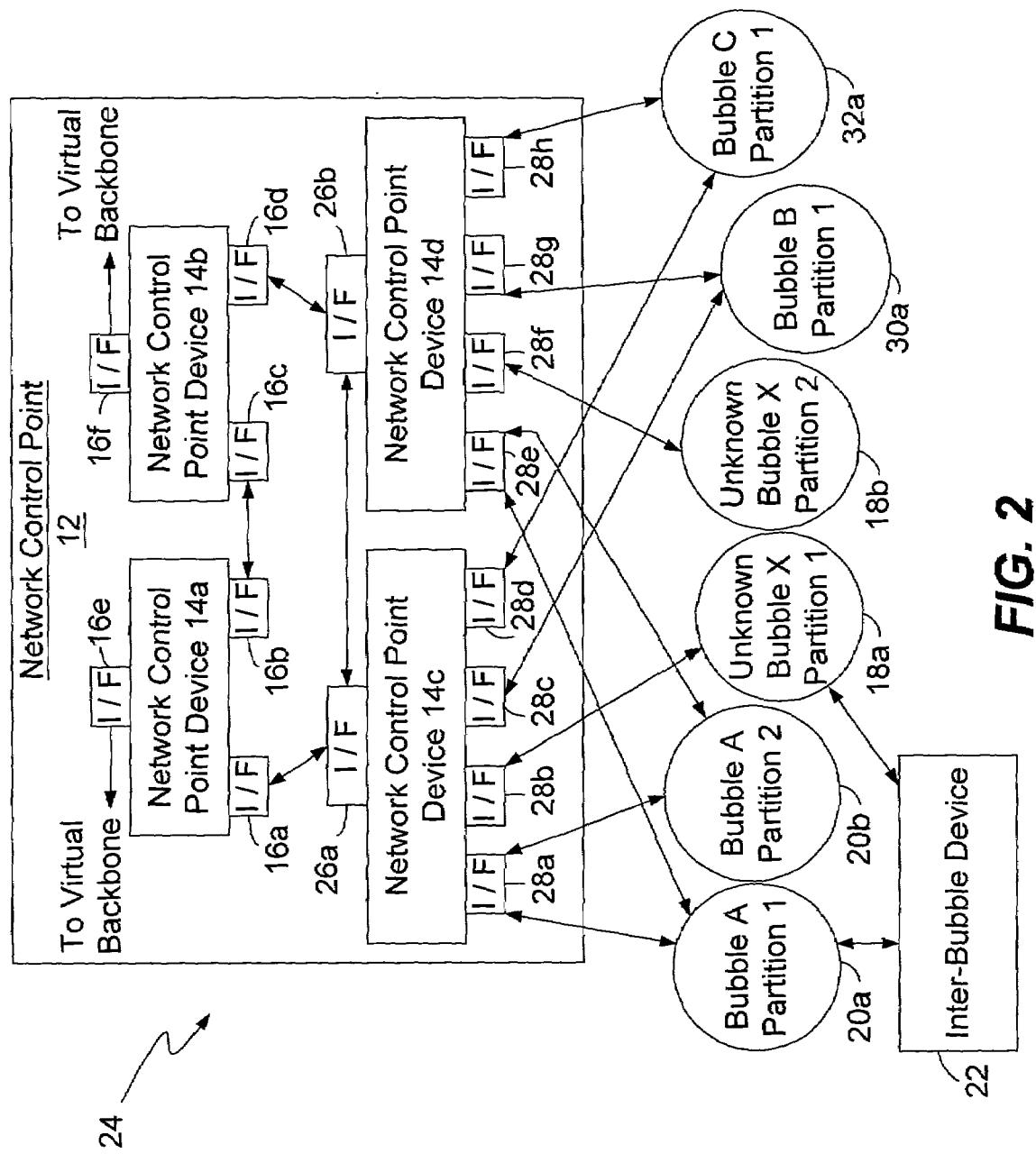
FIG. 2 is a simplified block diagram of a network security system that is more complex than the block diagram of the network security system of FIG. 1.

FIG. 2 is a simplified block diagram of a network security system 24. The network security system includes a network control point 12 and a number of network bubbles X, A, B, C. Each network bubble includes one or more bubble partitions. For example, bubble A includes bubble partition 20a and bubble partition 20b. In the case of an IP network, bubble partitions are defined by address ranges corresponding to one or more devices. In IP networks, address ranges are defined by a base address and a mask applied to the address to determine if an address is included in the range. Alternatively, bubble partitions may be defined by the placement of a network access point, which allows the network security system to be used with wireless networks. Other factors can be applied to distinguish bubbles based on the underlying network technology used.

In the case of an IP network, any host or network device having a network address within the address ranges for a given network bubble partition is described as being a member of that network bubble. Members of a network bubble have full network connectivity to all other members of the bubble, even if they are members of different partitions within the same bubble. For example, a host in bubble partition 20a has full network connectivity to all hosts in bubble partition 20a as well as bubble partition 20b. Bubble partitions 18a, 18b are partitions of unknown bubbles that represent the public Internet or a private network. Because the security policies of unknown bubbles are unknown, hosts within an unknown bubble partition may or may not have full network connectivity to all hosts within the same unknown bubble, or a different unknown bubble.

Each bubble partition 20a may include a number of bubble members that transmit data to and receive data from bubble members in other bubble partitions. All the members of a particular bubble partition 20a may access data from other members in the same bubble partition 20a without traversing a network control point device 14c or 14d (i.e., a bubble boundary). For example, bubble partition 20a may include bubble member Y and bubble member Z, and the bubble member Y has unrestricted network access to bubble member Z without traversing network control point device (i.e., interface 14c or 14d).

Bubble partitions 20a, 20b of the same bubble 20 may share a common interface 28a of the network control point device 14c. Bubble partitions can also be connected to multiple control point devices within the same network control point 12. FIG. 2 demonstrates, for the case of an IP network, that in the event of a network device failure or to achieve requirements for network utilization (e.g., load balancing, packet shaping, guaranteed performance), data can be routed between multiple devices within the same network control point to allow unrestricted network access between devices in the same or multiple bubble partitions of the same bubble.

However, before a device in one bubble partition 20a can have access to data from a device in another bubble partition 30a, the network control point device 14c or 14d must apply the network security policy of both of the bubble partitions 20a and 30a. Therefore, since each bubble 20 and 30 has a distinct network security policy, a device contained in one bubble partition 20a must satisfy the network security policy established by both of the bubble partitions 20a and 30a before gaining access to the device and data contained in the bubble partition 30a. That is, bubbles and bubble partitions have network security policies that can apply to both inbound and outbound data. In addition, all the bubble members from a particular bubble partition 20a may access data from another bubble partition 20b that belongs to the same bubble 20 by satisfying the network security policy established by bubble partitions 20a and 20b, which will be the same.

In the case of a bubble 20 with two bubble partitions 20a and 20b, a network device that is a member of partition 20a will have full network access to a device in bubble partition 20b because network control point device 14c or 14d will apply the uniform policy that all members of a known bubble have full network access to all other members of the same bubble regardless of partitioning.

Using FIG. 2 as an example, the network control point 12 includes a number of network control point devices 14a, 14b, 14c, 14d, each having a plurality of network interfaces. Network control point device 14a is connected to network control point device 14b via interfaces 16b, 16c and is connected to network control point device 14c via interfaces 16a, 26a. Similarly, network control point device 14d is connected to network control point device 14b via interfaces 16d, 26b and is connected to network control point device 14c via interfaces 26a, 26b. Network control point devices 14a, 14b route the data from one bubble partition to another, and provide source integrity and security. For example, network control point devices 14a, 14b are devices that receive data from and route data to other network control points. In addition, network control point devices 14a, 14b receive data from and route data to other network control point devices 14c, 14d and other network control points via interface 16e and 16f. Network control point devices 14c, 14d are bubble boundary devices that provide source integrity and enforcement of network security policies. Each network control point device may have interfaces in multiple bubble partitions. Therefore, a network control point device may be a member of multiple bubble partitions. For example, network control point device 14c is a member of bubble partitions A-1, A-2, X-1, B-1, and C-1.

Network traffic originating from a device located in bubble partition 20a will be subject to source integrity and security policy checks by device 14c or 14d before being routed to a device located in bubble partition 30a. The data will be routed to the destination device in bubble partition 30a provided that security policy for bubble partition 30a enforced by network control point device 14c or 14d permits this type of traffic and source integrity is not violated. In addition, one bubble partition does not automatically inherit the network security policy of another bubble partition. That is, even though network control point device 14c and 14d both enforce policy for bubble partitions 20a and 30a, bubble partition 20a does not inherit the network security policy of bubble partition 30a.

Depending on the type of networks, routing, and security policy requirements, the network control point devices 14a, 14b, 14c, 14d may be routers with access lists, a dedicated network firewall device, an application proxy or relay, a network gateway, or any appropriate device capable of enforcing source integrity, network security policy, and routing functions. A combination of devices performing these functions may also be used to achieve the desired functionality.

The network control point devices 14a, 14b, 14c, 14d enforce source integrity for the bubble partition that it is connected to. In an IP network, for example, source integrity is commonly referred to as anti-spoofing and means that a router will block data marked as originating from an address that is not part of the valid address range for a particular interface. Other methods for validating source integrity apply to other types of networks. By way of example, for lower level networks, a Media Access Control (MAC) address can be checked for validity against a list of known addresses. It is important for all network control point devices to strictly enforce source address integrity. Per source integrity practice for IP networks, a member of a network bubble is not permitted to send data outside the bubble partition if it is not sourced from an address within the range that defines its bubble partition. The concept of source integrity is known in the art and these examples are not intended to be exhaustive.

All bubble partitions of a single network bubble implement a common network security policy. An example of network security policy in an IP network is when a particular bubble boundary does not allow any User Datagram Protocol (UDP) traffic originating outside the bubble to come into the bubble, and that Transmission Control Protocol (TCP) connections must only originate from within the bubble with no additional restrictions on application protocols. Such rules might be appropriate when all hosts within the bubble include sufficient security measures to protect them from exploit launched through an allowed method of network communication. In this instance, antiviral software offering real-time protection against hostile content arriving over e-mail or the Web might be appropriate. Hence, bubble security is provided by a combination of network and host security measures. Host security is a combination of physical control, access restrictions, configuration management, operational processes, intrusion detection and response, and software version control. This example is only to illustrate the nature of network security policy. Depending on the security need, the sophistication of firewall technology available, and the type of network used, rules can be highly tailored to meet particular needs.

The network control point 12 is made up of network control point devices, e.g., 14c, that have at least two interfaces (I/F), e.g., 28a, 28b. Interface 28a may connect to one or more bubble partitions, e.g., 20a and 20b. An interface typically does not allow connection of two or more partitions of different bubbles without requiring the enforcement of network security policy at a network control point device 14. Also, the interfaces (e.g., 16a and 26a) might be part of the network control point devices that are used to interconnect network control point devices. The network control point may include multiple network control point devices for redundancy and for separating the tasks provided by each bubble boundary. These network control point devices may implement the same network security policy. Where ability to connect or addressing is used to determine bubble membership, bubble partitions belonging to different bubbles may not share the same network interface on network security policy devices. In an IP network, for example, two devices sharing the same LAN interface would, by definition of the underlying technology, be able to connect with each other and hence must share the same network security policy.

No topological hierarchy exists for the bubble partitions. In addition, one bubble, e.g., bubble A, may not be directly connected to another bubble, e.g., bubble B. Rather, data traveling between different bubbles must traverse at least one network control point device 14c or inter-bubble device 22. On the other hand, two bubble partitions of the same bubble may be connected directly to one another and may be connected to more than one network control point device within the same network control point. The network control point interconnects bubble partitions, network control point devices within the same network control point, and the network control point to other network control points. The network control point 12 also includes network control point devices 14a and 14b that connect through interfaces 16e, 16f to the virtual backbone.

Firewall policy synchronization is only required for the network control point devices that are implementing a common network security policy, rather than all the network control point devices across the entire company. Network security policy for any given host within a bubble partition is managed at O(1) firewalls, rather than O(n) firewall, where n is the number of external control points for the company. A common network security policy can exist in multiple geographic locations.

Figure 3:
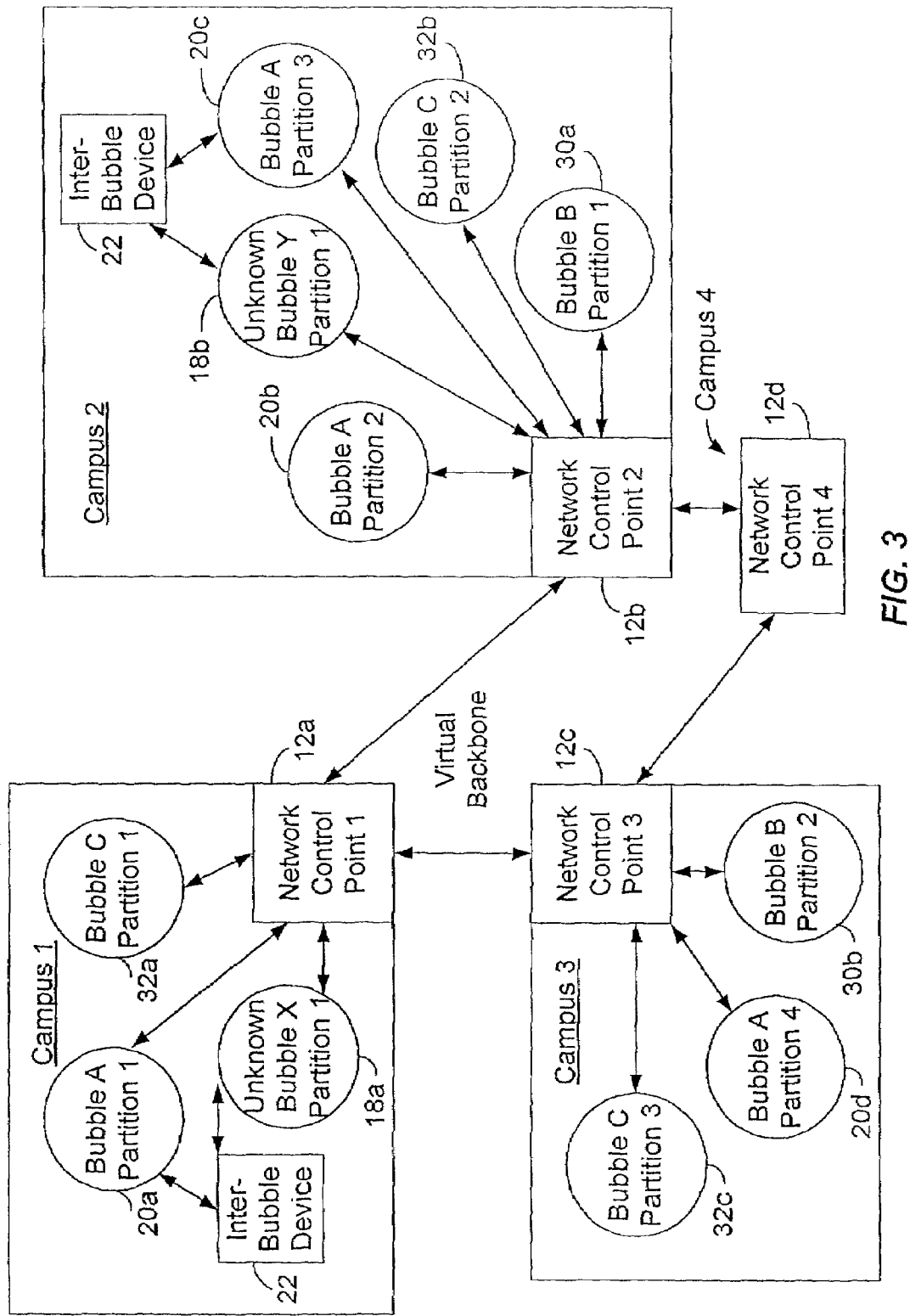
FIG. 3 is a simplified block diagram illustrating four different real or virtual locations utilizing the network security system of FIGS. 1 and 2.

FIG. 3 is a simplified block diagram illustrating four different real or virtual locations utilizing the network security system of FIGS. 1 and 2. Campus 1, 2, and 3 can be organized as four separate real or virtual locations or one location having four separate regions. The bubble configuration and connections for that network control point need not be known to permit interoperation with bubbles implemented at campuses 12a, 12b, and 12c. Network control point 4 (12d) may be implemented by another entity at any location.

Each campus is connected to one another via the network control point 12. More specifically, the network control point devices 14 of the network control point are coupled to one another. The network created by the interconnection of network control points forms a virtual backbone. The virtual backbone is a special network bubble type. It is the collection of all network control points 12 for an enterprise or entity implementing a network utilizing the principles of this invention along with the links connecting the network control points to each other. Typically an enterprise will have one virtual backbone, and service providers may have one or more depending upon the needs of their customers and the networking requirements imposed by their customer's needs. The number of virtual backbones is a function of implementation of the invention and has no bearing on the operation of the resulting network.

Regarding the virtual backbone, the source address of all bubble partitions must be strictly enforced at the network control points and integrity of the source address must be maintained in all virtual backbone links, which interconnect network control points. The minimum network security policy for the virtual backbone is that it will enforce source address integrity on its external connections, that is, not allowing external networks to send data that masquerade as being sourced from address space included in a known bubble implemented, or reserved for implementation.

Except in the case of a service provider that explicitly wishes to permit transit traffic, the virtual backbone will also enforce strict restrictions on transit data traffic, so that external networks will not make unauthorized use of the enterprise virtual backbone links. Although all other network bubble traffic for the enterprise will traverse the virtual backbone, it will remain a separate bubble unto itself. The virtual backbone is outside the bubble boundary or firewall and is external to all of the plurality of network bubbles. The bubble partitions themselves are not part of the virtual backbone, so they must utilize separate real or virtual equipment for LAN and WAN infrastructure that is contained entirely within a bubble boundary. This allows for a consistent network security policy for each bubble partition that may be managed and maintained independent of the virtual backbone that is used to interconnect network control points.

FIG. 3 demonstrates that relatively complex networks can be constructed across separate locations each implementing a consistent network security policy. Each network bubble may be controlled or owned by a different part of an enterprise. Bubble A consists of bubble partitions 20a, 20b, 20c and 20d implemented at 3 locations 12a, 12b, and 12c. Network security policy for bubble partition 20d will be enforced at network control points 12b, 12c, while enforcement for bubble partition 20a will be carried out at 12a. Network control points 12a, 12b, and 12c will enforce consistent network security policy for all partitions of bubble A. The same will be true of all partitions of all bubbles connected to every network control point within the virtual backbone.

The network security policy is enforced at each network control point 12. Enforcement at topologically "local" network control points eliminates wide area routing asymmetry issues and its restrictions on the use of stateful packet inspection firewalls. Asymmetric routing occurs when data between two points traverse different interfaces for any given round-trip exchange. By requiring all data for a particular bubble to traverse a single bubble boundary implemented by one or more network control point devices 14 located at a single network control point 12, the bubble boundary becomes a concentration point for all traffic hence providing a single point for enforcing network security policy regardless of asymmetry outside of the network control point. FIGS. 1, 2, and 3 demonstrate this embodiment of the network security system.

Figure 4:
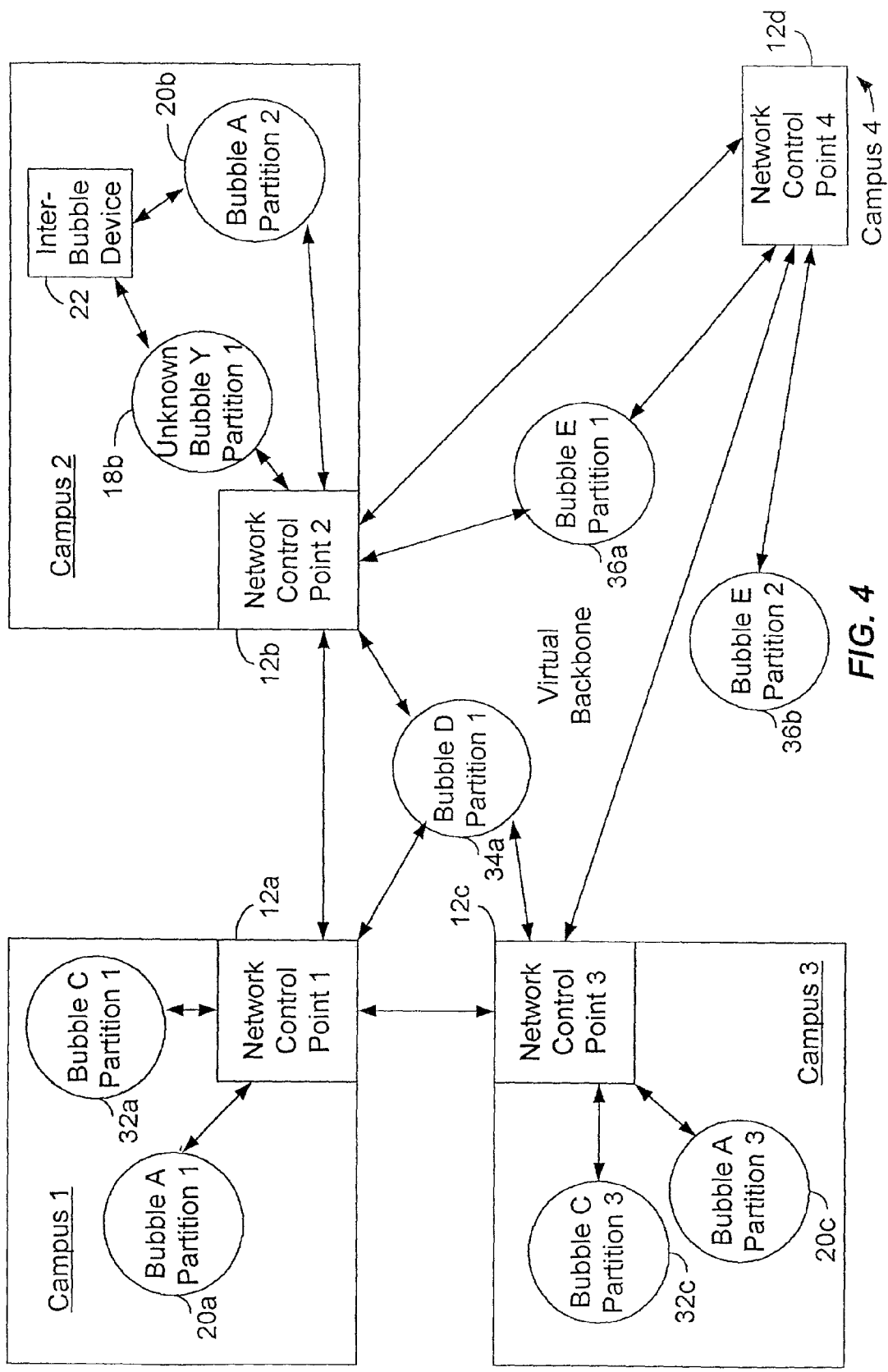
FIG. 4 is a simplified block diagram illustrating two bubble partitions distributed across four different real or virtual locations utilizing another embodiment of the network security system of FIGS. 1 and 2.

FIG. 4 is a simplified block diagram illustrating two bubble partitions distributed across four different real or virtual locations utilizing another embodiment of the network security system of FIGS. 1 and 2. The network security system of FIG. 4 may be appropriate where asymmetric routing is not a consideration. The network security system of FIG. 4 includes network bubble D having one bubble partition 34a and network bubble E having two bubble partitions 36a and 36b. Bubble partition 34a is connected to three network control points 12a, 12b, and 12c. Hence, all three network control points are topologically "local." Therefore, network devices in bubble partition 34a are subject to asymmetric routing. Bubble partition 36a is connected to two network control points 12b and 12d. Similarly, network devices in bubble partition 36a are subject to asymmetric routing. All network control points to which a bubble partition is directly connected must enforce the network security policy for the network bubble. Hence, the network security policy for all bubble partitions connected to multiple network control points is limited to those capabilities that can be controlled across multiple locations.

The network security policy for the network devices in each bubble partition is enforced identically at each of the multiple (m) network control points, where m is the number of network control points connected to a particular bubble partition. That is, if a bubble partition is connected to 10 different network control points, then m is equal to 10. The value of m is less than n, where n is the total number of network control points in the network security system. In this embodiment of the network security system, m is preferably at least one order of magnitude of 10 less than n. That is, if n is 100, then m is preferably less than 10, more preferably less than 5, and most preferably 1 or 2. These are only a few examples of the values of n and m. That is, the network security system of the present invention can utilize a variety of values for n and m while still maintaining the spirit and scope of the present invention.

Figure 5:
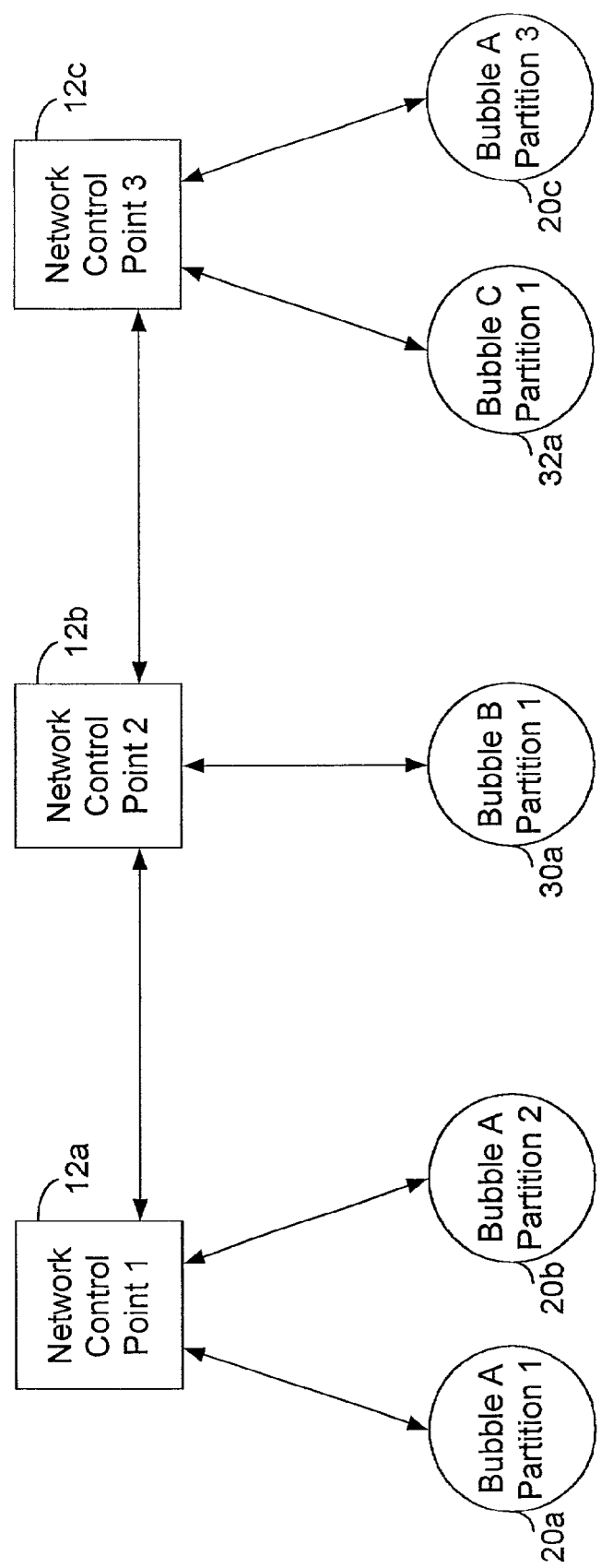
FIG. 5 is a simplified block diagram illustrating three different real or virtual locations utilizing another embodiment of the network security system of FIGS. 1 and 2.

FIG. 5 is a simplified block diagram illustrating three different real or virtual locations utilizing another embodiment of the network security system of FIGS. 1 and 2. The network security system of FIG. 5 illustrates a case where a network topology includes network control points 12a, 12b and 12c that act solely to route data as part of a virtual backbone. In this simplified block diagram of an embodiment of the network security system described in FIGS. 1 and 2, network bubble A has three bubble partitions 20a, 20b, and 20c. Two of the bubble partitions 20a and 20b are connected to a single network control point 12a. The third bubble partition 20c is connected to a single network control point 12c. Network bubble B has one bubble partition 30a connected to a single network control point 12b. Network bubble C has one bubble partition 32a connected to a single network control point 12c. There is a network connection between network control points 12a and 12b, and another network connection between network control points 12b and 12c. However, no network connection exists between control points 12a and 12c.

As in most of the embodiments of the network control system, except in the presence of an inter-bubble device, all data sent from or received by a network device in a bubble partition and destined for or received from a network device in another bubble partition must traverse a network control point device as part of a network control point. Hence, data sent from bubble partition 20a must traverse network control point 12a before it can be received at any other bubble partitions within the network control system. This principle can be similarly applied to all bubble partitions within the network security system.

In this example, data being sent or received between two partitions of the same bubble A 20a and 20c, must traverse network control points 12a and 12c. In addition, the data must also traverse network control point 12b since there is no direct connection between control points 12a and 12c. In this case, network control point 12b does not apply the network security policy of either bubble partition between which data is being transmitted. Rather, the devices of the network control point 12b perform a routing function and enforce the requirements of a virtual backbone (e.g. source integrity). This would be true of data transmitted between any bubble partitions connected to network control point 12a when sent or received from any partition connected to network control point 12c. Network control point 12b enforces network security policy only when data is being transmitted to or from network devices in bubble partition 30a. A network control point, e.g., 12b, that performs a routing function and/or enforces the requirements of the virtual backbone is referred to as an intermediate network control point.

The foregoing detailed description of the present invention is provided for the purposes of illustration and is not intended to be exhaustive or to limit the invention to the precise embodiment disclosed. Several embodiments of the network security system have been described that are provided for the purposes of illustration and are not intended to be exhaustive or to limit the invention to the precise embodiment disclosed. The embodiments may provide different capabilities and benefits depending on the configuration used to implement the network security system. Accordingly, the scope of the present invention is defined by the following claims.

What is claimed is:

1. A secure network configured to carry data, comprising:
a plurality of network bubbles, each network bubble having a plurality of bubble partitions, each bubble partition having at least one network device configured to transmit and receive data, and wherein each of the plurality of bubble partitions is connected to at least two network control point devices to achieve high availability in the case of a failed interface or network control point device;
all of the network devices corresponding to the same respective network bubble having unrestricted network access with each other and the same network security policy that controls data movement between the network devices of different network bubbles;
a network control point having one or more network control point devices, a first network device of a first network bubble being connected to the network control point through at least one network control point device and a second network device of a second network bubble being connected to the network control point through at least one network control point device wherein the network control point applies the security policy of the first network bubble to data for the first network device and the security policy of the second network bubble to data for the second network device, wherein the security policy of the first network bubble is distinct from the security policy of the second network bubble; and
an inter-bubble device connecting the first and second network bubbles to one another and enforcing the network security policy of the first and second network bubbles.

2. A secure network as defined in claim 1, wherein each of the plurality of bubble partitions that belong to the same bubble has the same network security policy applied at each of the plurality of network control points that are connected to the plurality of bubble partitions.

3. A secure network as defined in claim 1, wherein each of the plurality of bubble partitions has unrestricted network connectivity to all other bubble partitions within the same bubble.

4. A secure network as defined in claim 1, wherein each of the plurality of bubble partitions is defined by an address range.

5. A secure network as defined in claim 4, wherein each of the network devices in each of the plurality of bubble partitions has an address contained within the address range.

6. A secure network as defined in claim 5, wherein each address exists in only one of the plurality of bubble partitions.

7. A secure network as defined in claim 1, wherein each of the plurality of network control points ensures source address integrity at each bubble boundary.

8. A secure network as defined in claim 1, wherein data may be transmitted between two network devices in different bubble partitions of the same network bubble without restriction by the network bubble boundaries.

9. A secure network as defined in claim 1, wherein the plurality of network control points are coupled to one another and form a virtual backbone that is external to all of the plurality of network bubbles.

10. A secure network as defined in claim 9, wherein each of the plurality of network control points ensure source address integrity across the virtual backbone.

11. A secure network as defined in claim 1, wherein each network device connects to only one network control point.

12. A secure network as defined in claim 1, wherein the total number of network control points is greater than the number of network control points connected to any one particular bubble partition.

13. A secure network as defined in claim 1, wherein all data transmitted from one network device to another network device traverses only one network control point.

14. A secure network as defined in claim 1, wherein all data transmitted from one network device to another network device traverses only two network control points.

15. The secure network as defined in claim 1 wherein at least two of the plurality of bubble partitions associated with the first network bubble are in different geographic locations, wherein each partition connects to a different network control point device which enforces the security policy of the first network bubble for the devices in the respective partition.

16. The secure network as defined in claim 1 wherein the inter-bubble device applies the network security policy of both the first network bubble and the second network bubble to move data between the first and second network bubbles.

17. A secure network configured to transmit data, comprising:
 a first and second network bubble, each network bubble having a distinct network security policy and a plurality of bubble partitions, each bubble partition having a plurality of network devices having unrestricted network access with each other and configured to transmit and receive data, wherein each of the plurality of bubble partitions is connected to at least two network control point devices to achieve high availability in the case of a failed interface or network control point device;
 a network control point having one or more network control point devices, a first network device of the first network bubble being connected to the network control point to which a second network device of the second bubble is also connected, wherein the network control point device applies the distinct security policy of the first bubble to data for the first network device and the distinct security policy of the second bubble to data for the second network device to control movement of data between the first and a second network bubble; and
 an inter-bubble device connecting the first and a second network bubble to one another and enforcing the network security policy of the first and a second network bubble.

18. A secure network as defined in claim 17, wherein all data transmitted from one network device in the first network bubble to another network device in the second network bubble traverses only one network control point.

19. A secure network as defined in claim 17, wherein all data transmitted from one network device in the first network bubble to another network device in the second network bubble traverses only two network control points.

20. A secure network as defined in claim 17, wherein all data transmitted from one network device in the first network bubble to another network device in the second network bubble traverses more than two network control points.

21. A secure network as defined in claim 17, wherein the network control point enforces source integrity for all bubble partitions that are connected to it.

22. A secure network as defined in claim 17, wherein each bubble partition connects to only one network control point.

23. A secure network as defined in claim 17, wherein each of the plurality of bubble partitions that belong to the same bubble has the same network security policy applied at each of the plurality of network control points that are connected to the plurality of bubble partitions.

24. A secure network us defined in claim 17, wherein each of the plurality of bubble partitions has unrestricted network connectivity to all other bubble partitions within the same network bubble.

25. A secure network as defined in claim 17, wherein each of the plurality of bubble partitions is defined by an address range.

26. A secure network as defined in claim 25, wherein each of the plurality of network devices in each of the plurality of bubble partitions has an address contained within the address range.

27. A secure network as defined in claim 26, wherein each address exists in only one of the plurality of bubble partitions.

28. A secure network as defined in claim 17, wherein data may be transmitted between two network control point devices in different bubble partitions of the same network bubble without restriction by the plurality of network control points.

29. A secure network as defined in claim 17, wherein the plurality of network control points are coupled to one another and form a virtual backbone that is external to the first and the second network bubble.

30. A secure network as defined in claim 29, wherein each of the plurality of network control points ensure source address integrity across the virtual backbone.

31. A secure network as defined in claim 17, wherein the interbubble device is connected to the first network bubble and the second network bubble without being connected to the plurality of network control points and configured to enforce the network security policy of the first and the second network bubble.

* * * * *